UNITED STATES PATENT OFFICE.

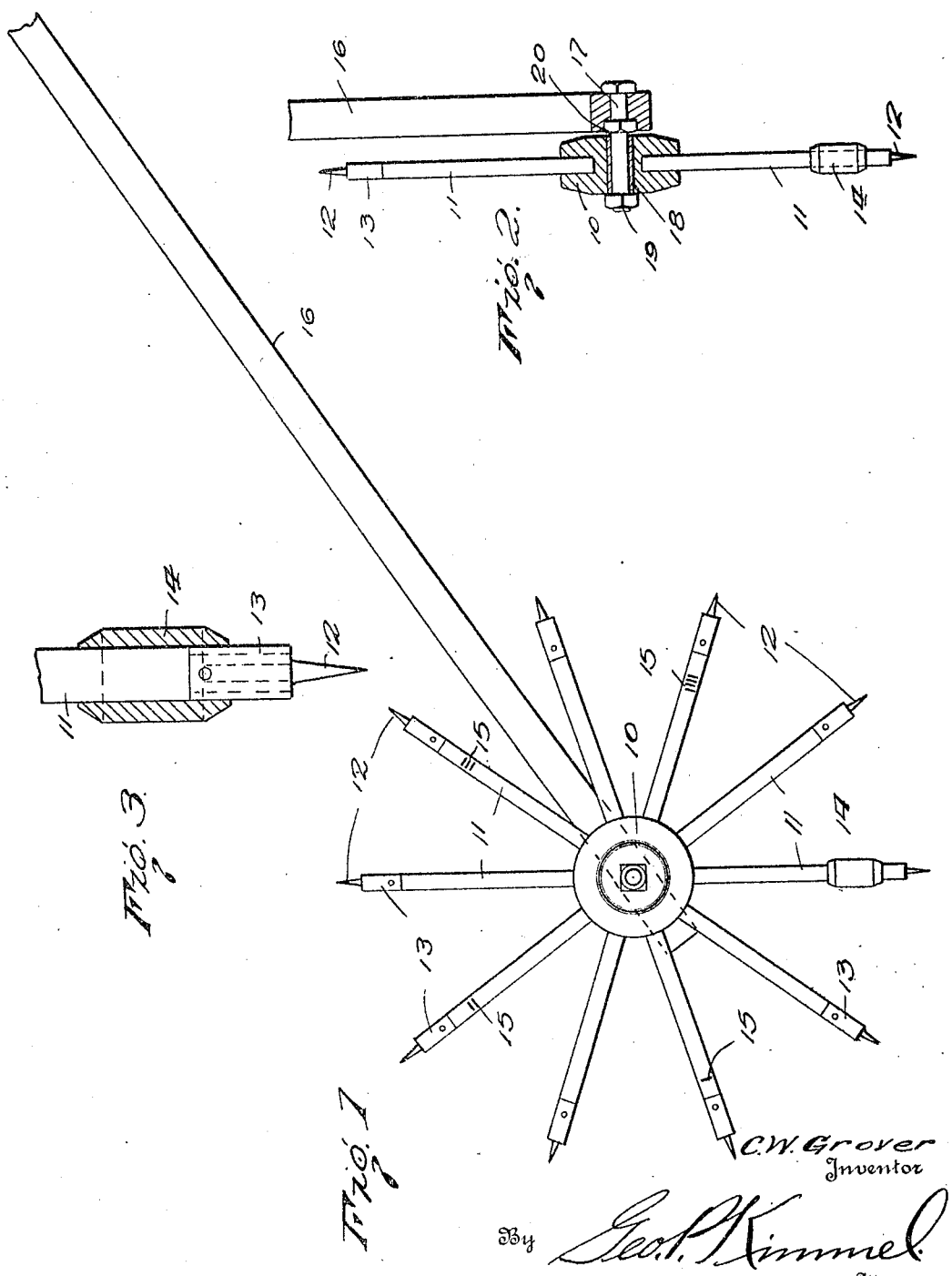

CHARLES W. GROVER, OF PLEASANT POND, MAINE.

LOG-MEASURING WHEEL.

1,291,485. Specification of Letters Patent. Patented Jan. 14, 1919.

Application filed October 4, 1918. Serial No. 256,835.

*To all whom it may concern:*

Be it known that I, CHARLES W. GROVER, a citizen of the United States, residing at Pleasant Pond, in the county of Somerset and State of Maine, have invented certain new and useful Improvements in Log-Measuring Wheels, of which the following is a specification.

This invention relates to measuring appliances, and more particularly to an improved measuring device or wheel for measuring the length of logs and designed to be used by scalers and surveyors of logs so as to facilitate the measuring thereof.

A further object of the invention is to provide a measuring wheel adapted to replace the ordinary four-foot scale rule as is at present employed by scalers and surveyors of logs in measuring the length thereof, the device being so constructed as to permit the measuring thereof with quickness and accuracy, as well as allowing for the log being crooked, thereby insuring that the proper measurement will be given.

With the above and other objects in view as will appear as the description proceeds, the invention comprises the novel features of construction, combinations of elements and arrangement of parts which will be more fully described in the following specification and then finally embodied in the clauses of the claim which are appended hereto and which form an essential part of the same.

Reference is had to the accompanying drawings forming a part of this application, wherein like reference characters will refer to corresponding parts throughout the several views, in which—

Figure 1 is a side elevation of my improved log measuring wheel,

Fig. 2 is a vertical sectional view thereof, and

Fig. 3 is a detailed view of one of the weighted spokes of the wheel.

Referring to the drawings in detail, my improved measuring wheel is shown as comprising a hub 10 from which radiates a plurality of equidistantly spaced spokes 11. These spokes are preferably employed ten in number, with a distance between the extremities thereof exactly equal to six inches. For this purpose, each spoke is provided with a metallic pointed tip or projection 12 mounted in the end thereof and secured as by means of a ferrule 13, the pointed projections or tips entering the log and preventing slipping as the wheel is rotated. One of the spokes is preferably painted black and provided with a weight 14 to distinguish it from the remaining spokes, and each alternate spoke is provided with an indication as shown at 15, registering successively, from 1 to 5 feet which is the circumference of the wheel or log measuring appliance. That is, the distance between or laid off by two spokes, is exactly one foot.

The hub is designed to be mounted upon a stick or handle 16, the latter having an aperture receiving therethrough an axle or pivot 17, which also extends through a ferrule or sleeve 18 in the hub 10, being removably secured, as by means of clamping nuts 19 and 20, so as to secure the axle to the stick or handle and permit the wheel to be removed or lubricated, as shall be found desirable or necessary. Also, the wheel can be removed for applying a new one to the handle or stick, as will be obvious. The weight 14 is held upon the spoke thereof by friction or otherwise and in the operation of the device, it is obvious that the weight 14, will cause the spoke thereof to be disposed lowermost when the device is disposed so as to engage a log. Then, instead of using the ordinary four-foot measuring stick and continuing the measuring operation with little possibility of securing accurate measurement, especially when in a hurry and measuring a crooked log, the operator rolls the wheel or measuring appliance along the log as he walks along the same, and the wheel of course revolves and each revolution gives exactly five feet in length. The odd feet from 1 to 5 being marked on alternate spokes, the accurate measurement of the log is possible, as well as allowing for a log being crooked, inasmuch as the wheel follows the contour of the log and an exact measurement is insured. This will avoid the usual operation of laying down the ordinary four-foot rule a number of times in going the length of the log, and obviates inaccurate measurement as occurs when in a hurry and also due to the inaccurate placing of the rule at the end of each measurement.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

A log measuring appliance for measuring the length thereof, comprising a hub, a series of equidistantly spaced radiating spokes projecting from the hub, pointed end portions at the ends of said spokes adapted to pierce the log when wheeled along the same, ferrules securing said end portions in position, a weight on one of said spokes to cause the same to be disposed lowermost when spaced for measuring, the spaces between each two spokes amounting to six inches and the entire circumference being five feet, each alternate spoke having markings thereon indicating the number of feet circumference and the distance laid off by the wheel, and a handle on which said wheel is rotatably mounted through the medium of said hub.

In testimony whereof I affix my signature hereto.

CHARLES W. GROVER.

Copies of this patent may be obtained for five cents each, by addressing the "Commissioner of Patents, Washington, D. C."